United States Patent [19]
James

[11] Patent Number: 5,689,262
[45] Date of Patent: Nov. 18, 1997

[54] ELECTRONIC BAFFLE AND BAFFLE CONTROLLED MICROWAVE DEVICES

[75] Inventor: Jesse Clopton James, Huntsville, Ala.

[73] Assignee: McDonnell Douglas Corporation, Huntington Beach, Calif.

[21] Appl. No.: 670,662

[22] Filed: Jun. 26, 1996

Related U.S. Application Data

[60] Division of Ser. No. 353,189, Dec. 9, 1994, Pat. No. 5,596,324, which is a continuation-in-part of Ser. No. 273,576, Jul. 11, 1994.

[51] Int. Cl.⁶ ................................................. H01Q 9/40
[52] U.S. Cl. .................... 342/5; 342/159; 343/834; 343/815; 343/817; 343/818
[58] Field of Search ....................... 343/815, 817, 343/818, 834; 342/198, 5, 159

[56] References Cited

U.S. PATENT DOCUMENTS

| | | | |
|---|---|---|---|
| 2,189,910 | 2/1940 | Kramar | 343/834 |
| 2,416,252 | 2/1947 | Fisher | 343/815 |
| 2,911,601 | 11/1959 | Gunn et al. | |
| 2,973,512 | 2/1961 | Walsh | |
| 3,471,811 | 10/1969 | Klotz | |
| 3,478,246 | 11/1969 | Perkins et al. | |
| 3,478,247 | 11/1969 | Hull | |
| 3,500,251 | 3/1970 | Peace | |
| 3,570,007 | 3/1971 | Whitehead | |
| 3,649,855 | 3/1972 | Auld | |
| 4,164,742 | 8/1979 | Nemit | 343/768 |
| 4,229,745 | 10/1980 | Kruger | 343/771 |
| 4,290,071 | 9/1981 | Fenwick | 343/815 |
| 4,611,214 | 9/1986 | Campbell et al. | 343/834 |
| 4,724,443 | 2/1988 | Nysen | 343/829 |
| 5,182,570 | 1/1993 | Nysen et al. | 343/818 |
| 5,187,449 | 2/1993 | May | 331/66 |

FOREIGN PATENT DOCUMENTS

| | | | |
|---|---|---|---|
| 767531 | 9/1952 | Germany | 343/815 |
| 843634 | 8/1960 | United Kingdom | 342/198 |

*Primary Examiner*—Stephen M. Johnson
*Attorney, Agent, or Firm*—Bell Seltzer Intellectual Property Group of Alston & Bird LLC

[57] ABSTRACT

Microwave devices incorporate at least one photosensitive baffle that is selectively illuminated, changing the baffle's electronic characteristic from being transparent to microwave energy to being reflective thereof. That action selectively alters an electronic characteristic of the microwave device. The effect is shown applied in a number of devices, including a back lobe antenna. Undesired back lobes occuring at a principal frequency are reduced in a back plane antenna by alternately coupling and decoupling an extension to the antenna's back plane at a rate sufficiently high enough to shift the back lobes to adjacent frequencies. A photoelectrically controlled baffle suitably serves as the extension.

4 Claims, 5 Drawing Sheets

C' -- C'

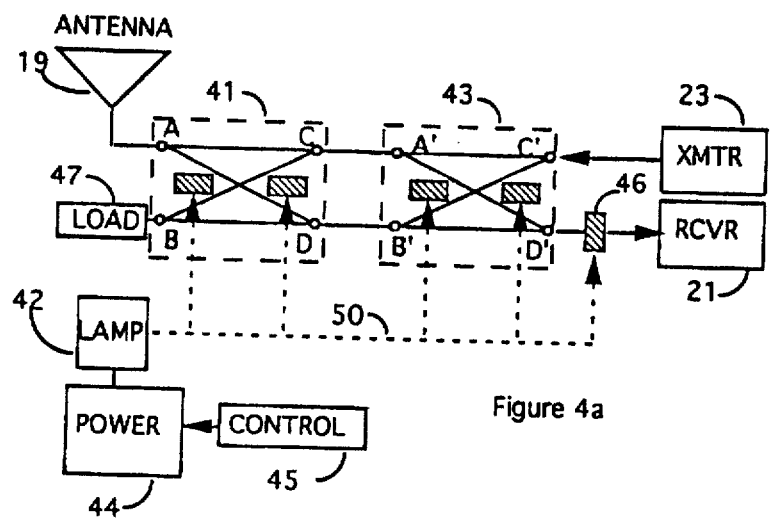
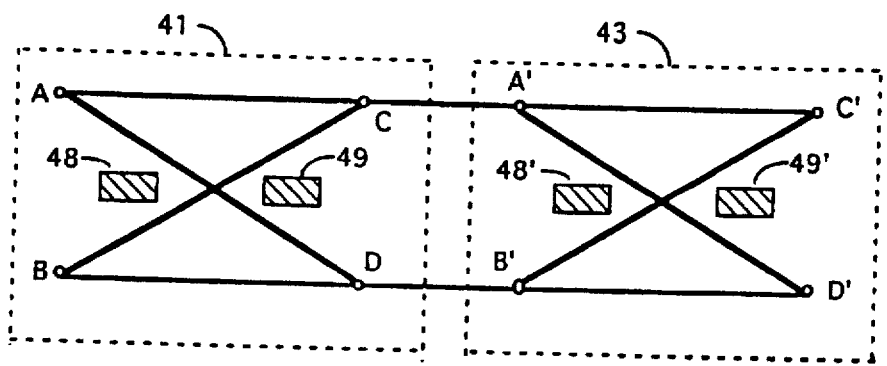
Figure 4a
Figure 4b
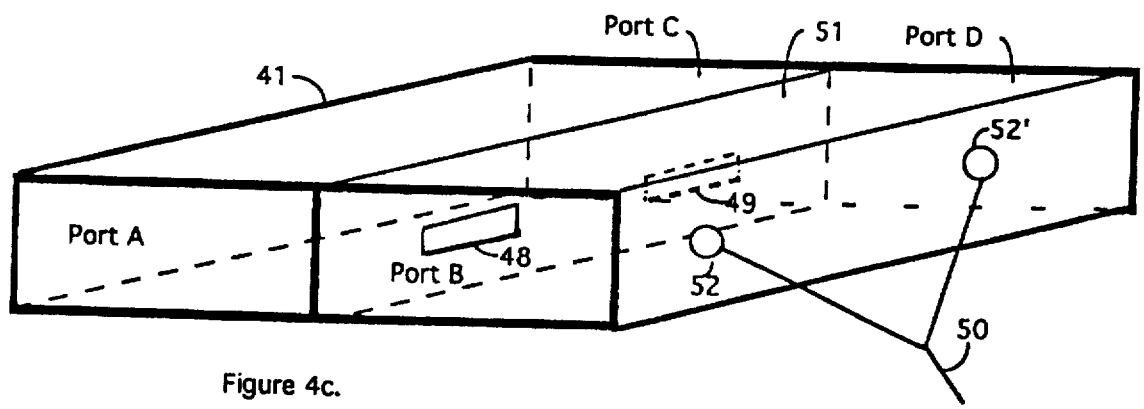
Figure 4c.

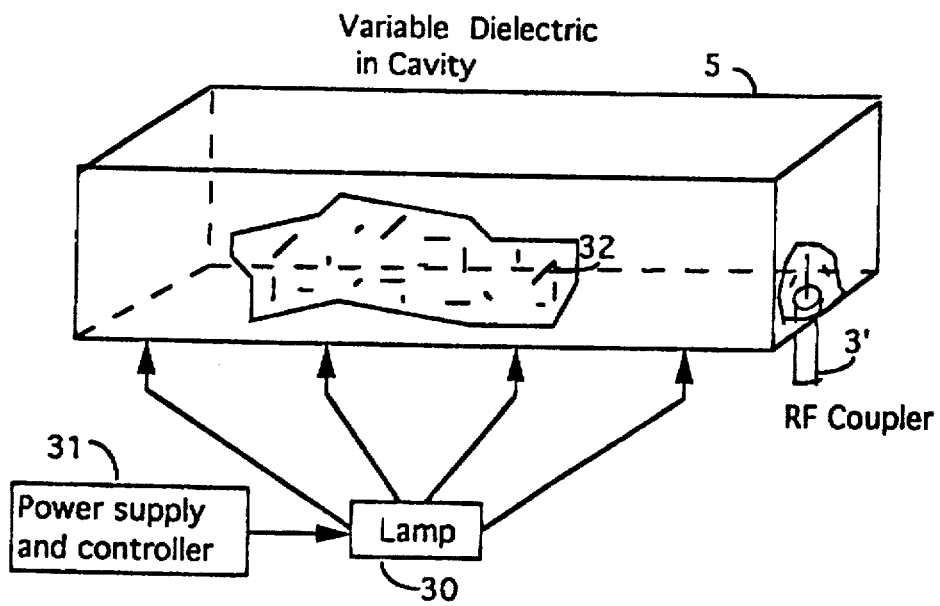
Figure 7
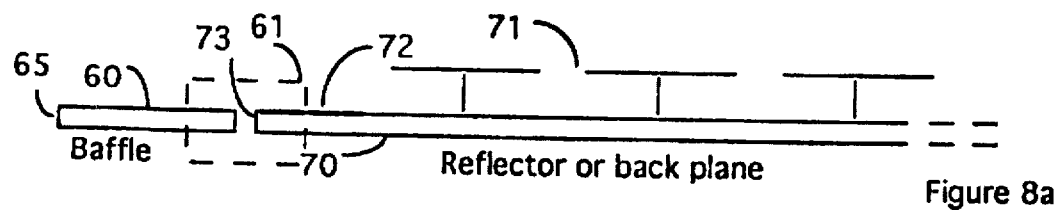
Figure 8a
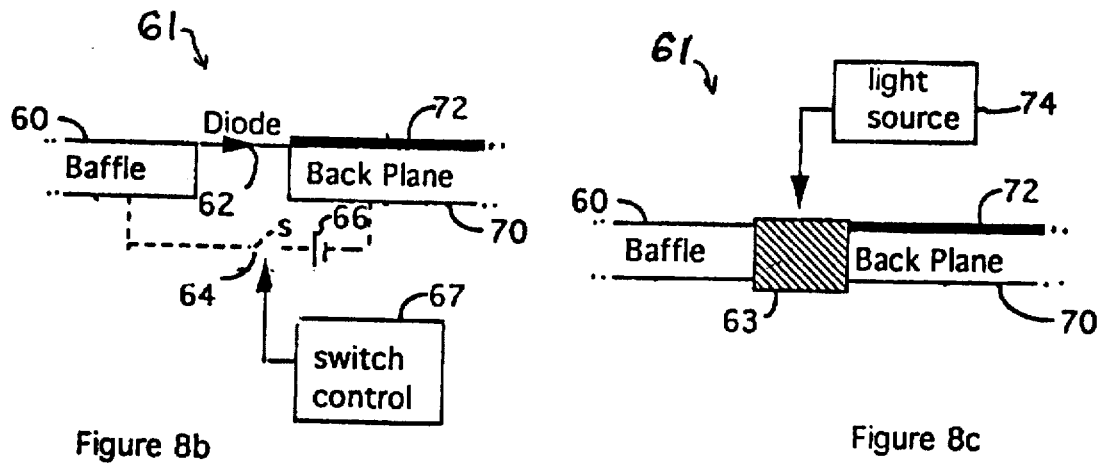
Figure 8b
Figure 8c

ELECTRONIC BAFFLE AND BAFFLE CONTROLLED MICROWAVE DEVICES

The present invention is a division of application Ser. No. 08/353,189 filed Dec. 9, 1994 now U.S. Pat. No. 5,596,324 which is a continuation in part of my earlier filed application, Ser. No. 08/273,576 filed Jul. 11, 1994, entitled Synthetic Aperture Radar Smearing, copending herewith, for which the benefit of 35 U.S.C. 120 is claimed.

FIELD OF THE INVENTION

This application relates to electronic baffles and, more particularly, to improved microwave devices, such as antenna back lobe reducers, resonant microwave cavities, transmit-receive switches and waveguide junctions, that incorporate a dual state electronically controlled surface or baffle as a controlled element of the respective microwave device.

BACKGROUND

Many electronic devices incorporate baffles to produce known electrical effect within the associated device. Examples are found in resonant microwave cavities, terminations and deflectors in waveguides and other such transmission lines, and in transmit-receive protectors in radars. Baffles are usually adjusted or changed manually or mechanically to adjust an electronic characteristic of the associated device. However, there are circumstances in which a remotely controlled and rapidly changeable baffle should prove a more significant and highly desirable asset.

The frequency of a Klystron tube, commonly used in radars to generate or amplify microwave signals, may be rapidly changed by altering the size of its tuning cavity using a movable baffle. That effect was earlier recognized by Klotz in U.S. Pat. No. 3,471,811, granted Oct. 7, 1969, which describes tuning a microwave cavity using an electrically operated piezoelectric mechanism to physically position a metal wall, by Perkins et al in U.S. Pat. No. 3,478,246, granted Nov. 11, 1969 and also by Hull in U.S. Pat. No. 3,478,247, granted Nov. 11, 1969, wherein a coaxial magnetron tube incorporates a piezoelectric mechanism to rapidly mechanically position a cavity wall to provide frequency tuning of the magnetron. Although electronic in nature, at a more microscopic view, such tuning is somewhat mechanical in nature in that an electrically conductive metal coating or layer is physically moved by the piezoelectric mechanism. An advantage to tunable microwave cavities that incorporate the present invention is that microwave cavities may be tuned without mechanical movement of the tuning element.

Radar TR switches are another example. When the transmitter and receiver are connected to a common antenna, as is typical for many radars, the highly sensitive receiver must be protected from the high power RF that is generated by the transmitter during transmission of that RF power to the antenna. That protection is provided by a transmit-receive protector, an electronic device generally referred to simply as a TR switch, and which acts as an electronic gate. In operation, when the radar transmitter generates RF, the TR switch short circuits the antenna inputs to the receiver, effectively closing the gate to the receiver. In the intervening periods when the transmitter is not applying RF to the antenna, the TR switch opens the RF signal path to the receiver, allowing any low power RF received at the antenna to propagate to the receiver.

Typical TR switches are formed of either a solid state switching device or a gas tube, which is connected in shunt of the receiver's input. With the gas tube, when the transmitter is generating RF, the voltage on the line from the transmitter is high, and the gas in the tube consequently ionizes and conducts current, thereby short circuiting the receiver input and protecting the receiver. The present invention provides a new form of TR switch that requires neither gas tubes or semiconductor switches.

Accordingly, an object of the invention is to provide a new form of electronic baffle for use in microwave devices.

Another object of the invention is to provide improved electronic tuning for microwave devices that may be easily controlled by remotely located controls.

Still another object is to provide an improved TR switch for radar systems that does not use gas tubes or semiconductor switches.

And an ancillary object of the invention is to provide an improved RF transmitting antenna that minimizes the generation of side and back lobes.

SUMMARY OF THE INVENTION

In accordance with the foregoing objects, microwave devices are modified to incorporate at least one baffle formed of photosensitive material and with such baffle new forms of microwave devices are possible. The baffle effectively serves as a gate, tuning element, reflector or the like within the microwave devices. Selectively illuminating the baffle changes the baffle's electronic characteristic from being transparent to microwave energy to being reflective. Such switchover occurs rapidly; in practical embodiments switching between alternate states requires as little as two nanoseconds.

In a tunable microwave cavity constructed according to the invention, a series of such photosensitive baffles are fixed in spaced relationship within a conductively walled tuning cavity, spaced apart from one another and attached to side walls of the cavity and illumination sources are optically coupled to associated baffles. The illumination sources are selectively energized to illuminate a selected baffle and, thereby, effectively change the size of the cavity. In turn, the size change changes the cavity's resonant frequency.

Within a TR switch constructed according to the invention, one baffle physically blocks entry to the microwave transmission line between the antenna input and the receiver input and a second baffle physically blocks the microwave transmission line between the antenna and the radar transmitter output. A controlled source of light illuminates the first baffle when an associated radar is transmitting RF, rendering the baffle electrically conductive. Thereby the radar's output is prevented from propagating to the receiver. Simultaneously the controlled source of light, normally illuminating the second baffle, extinguishes illumination of that baffle, rendering the second baffle transparent to RF, and allowing the radar's output to pass through to the antenna. When the associated radar is not outputting RF, illumination for the first baffle is extinguished by the controlled source and, instead, illumination of the second baffle is restored. RF signals from the antenna may propagate to the associated radar receiver through the now transparent baffle, while the second baffle is electrically conductive and blocks that RF from propagating to the radar transmitter.

Another embodiment of the invention defines an entirely new form of antenna device. In the kind of antenna that contains at least one radiating element and a back plane or reflector, which typically creates undesired back lobes at the principal transmitting frequency, a baffle of the aforedescribed kind and approximately a quarter wavelength in

3 width is positioned adjacent the antenna's back plane and control circuits alternately complete and extinguish an electric circuit between the back plane and the baffle at a periodic rate sufficient to shift the frequency of the signal generated by the back lobe to frequencies out of the range. The improved antenna formed by the foregoing relationship of antenna and baffle avoids the undesired back lobes at the principal frequency.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the Drawings:

FIG. 4a schematically illustrates an alternate embodiment of a novel TR switch structure in a microwave system; FIG. 4b is an electrical schematic of the TR switch in FIG. 4a, and FIG. 4c is a pictorial view of one section of the TR switch of FIG. 4a;

FIG. 7 pictorially illustrates a microwave cavity filled with a photoelectric baffle of the type shown in FIG. 6; and FIGS. 8a–8c pictorially illustrate an antenna incorporating the photoelectric baffle to reduce back and side lobes that are ordinarily generated by prior antennas of the same type.

DESCRIPTION OF THE PREFERRED EMBODIMENTS

Figure 1:
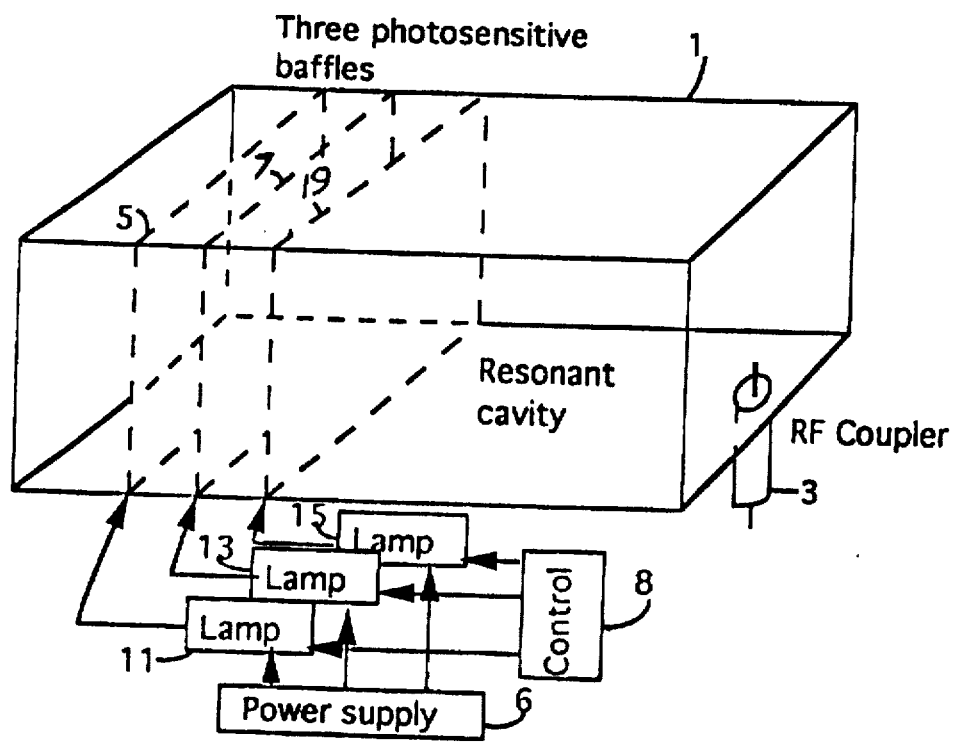
FIG. 1 illustrates an embodiment of a tunable microwave cavity constructed according to the invention.

Reference is made to FIG. 1, which pictorially illustrates a preferred embodiment of a tunable resonant cavity constructed according to the present invention. This includes a cavity 1 having electrically conductive internal walls, suitably formed of copper or sliver plated copper as example, whose walls are represented in the figure as being transparent for purposes of illustration. In this embodiment the cavity is of a rectanguloid shape, containing six rectangular walls that define an essentially closed region. However, as those skilled in the art appreciate, microwave cavities are formed in many other shapes, including odd shapes that are not rectangular and in other embodiments such alternate cavity shapes may be used. A standard RF coupling 3 opens into the cavity. Coupling 3 is a standard device for coupling RF between the cavity and external RF equipment, not illustrated, such as an oscillator and/or tuned amplifier.

Three baffles 5, 7 and 9 are positioned in spaced relationship with one another inside the cavity. The baffles are located at different distances from the right hand wall. Physically, each baffle defines a barrier or wall within the cavity. The baffles are photosensitive light sensitive panels. To RF power, the baffle is either a barrier or is transparent, depending upon the state in which it is switched, as hereafter described.

The baffles are constructed of photosensitive material that is formed into a rigid panel that is self supporting. The baffles are placed at locations in the cavity that reduce the volume of the cavity and may not be as large in area as that used in the baffles in the embodiment of FIG. 1. Suitable photosensitive materials for the baffle include GaAs, GaN, silicon germanium alloys and photoconductive polymers.

Three lamps 11, 13 and 15, symbolically illustrated, are provided, one associated with each baffle, to provide the illumination for controlling the RF characteristics of the baffles. Lamp 11 is optically coupled to baffle 5; lamp 13 to baffle 7 and lamp 15 to baffle 9. The optical coupling to the baffle may be furnished by a light guide, such as an optical fiber or by a lens, all of which are conventional in structure and readily available on the market. For applications that require the lamps to rapidly produce and extinguish light, creating a train of light pulses, conventional light emitting diodes, arc lamps or lasers are preferred. In less demanding applications that permit lamps to produce and extinguish light less rapidly, incandescent lamps should be suitable.

A power source 6 and control circuit 8, symbolically illustrated, supply power and provide for switching the respective lamps on or off, respectively. The control equipment is of any conventional type. Such equipment may be remote in position from the cavity or positioned as close thereto as desired. In operation, control circuit 8 selectively supplies power to one of the lamps or to none of them, depending upon the frequency to which the operator desires to tune the cavity. In operation, RF coupler 3 is coupled to a microwave system, not illustrated. The microwave system is of any conventional structure that makes use of a tuned microwave cavity.

When all three lamps are extinguished, the baffles are electrically non-conductive and, hence, are transparent to RF energy. In that case, since the three baffles are effectively transparent to RF within the cavity, the size of the microwave cavity is largest. Since the frequency of resonance of the cavity is an inverse function of the cavity size, the case represents the maximum cavity size and, hence, the lowest possible resonant frequency.

When lamp 15 illuminates baffle 9, the photosensors in that baffle are electrically conductive, and the baffle thereby defines a conductive surface that is closest to the right side wall, thereby electronically reducing the size of cavity 1 to the smallest possible size. The resonant frequency of the cavity is then highest in frequency. With only baffle 5 rendered conductive by illumination from associated lamp 11, the cavity is resonant at another frequency, higher than the lowest frequency available from the full size cavity; and with only baffle 7 rendered conductive by its associated lamp 13, the cavity is resonant at a still higher frequency, but lower in frequency than that frequency attained when baffle 9 is in its conductive state. The resonant frequency of cavity 1 is thus adjusted to one of four possible frequencies by selectively rendering the baffles to the conductive state or retaining all of the baffles in the non-conductive state.

Microwave systems often employ a resonant cavity to tune the system to a particular frequency. Typically tuning is accomplished by positioning of a baffle within or as a movable wall to the cavity. In this embodiment of the invention the barriers are fixed in position and are selectively transparent or conductive to RF, essentially allowing an adjustment in the effective cavity size.

It is appreciated that the particular intermediate and highest frequency obtained in the foregoing arrangement depends upon the initial placement of the baffles inside the cavity. By positioning the baffles more close to the right side wall, as example, the frequencies to which the cavity may be tuned in steps, will be higher still.

Although the foregoing embodiment of the invention incorporates three baffles, it is appreciated that any number of such baffles and associated driving lamps may be incorporated in other embodiments as will permit tuning the cavity to a greater number of discreet frequencies.

Figure 2:
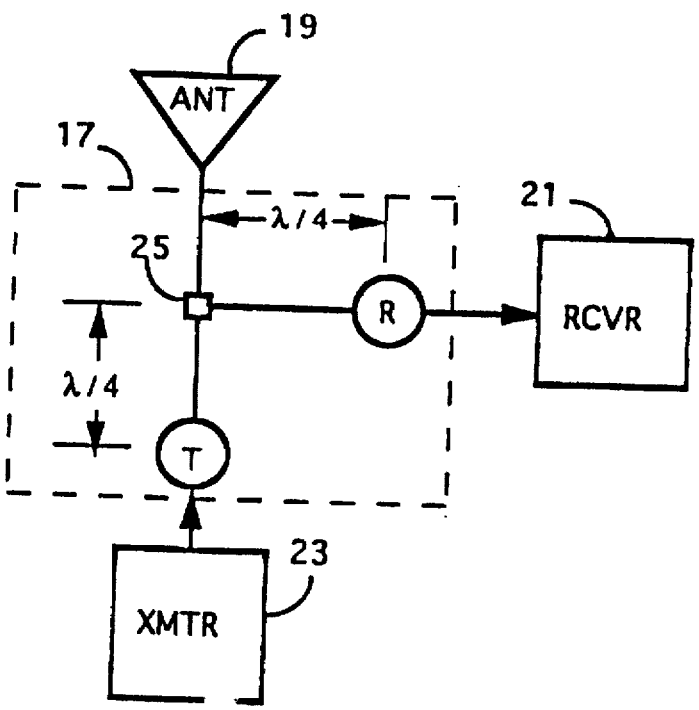
FIG. 2 symbolically illustrates an embodiment of a TR switch constructed according to the invention.

Photoelectric Baffles of the foregoing type are advantageously also incorporated as an element of a TR switch, together with the associated illumination control circuits, to gate microwave RF energy and protect the receiver in which the TR switch is used from damaging RF levels. Reference is now made to FIG. 2, which schematically illustrates a TR switch, and to FIGS. 3a, b and c, which symbolically illustrates a portion of that switch.

As those skilled in the art appreciate, the TR switch 17, represented in dash lines in FIG. 2, with the solid lines representing the coaxial transmission lines or waveguides, is connected by suitable couplings to the antenna 19, the receiver 21 and the transmitter 23. The TR switch is represented by the receive portion R and the transmit portion T, which represent the baffles, as hereafter described in greater detail, positioned one quarter wavelength at the transmitters operating frequency from junction 25. When R is electrically conductive and short circuits the respective coaxial line or waveguide to the receiver, the short circuit impedance is reflected as an open circuit at the entrance to this branch of the waveguide to the receiver. The same holds true for T.

The transmission lines leading from switch 17 connecting the latter to the respective transmitter and antenna in FIG. 2 may be any type of transmission line capable of carrying the transmitter power and having the proper line impedance. The more common type of lines available for that purpose are coaxial cable and waveguide. A like choice may be made for the particular transmission line connecting the TR switch to the receiver.

Figure 3A:
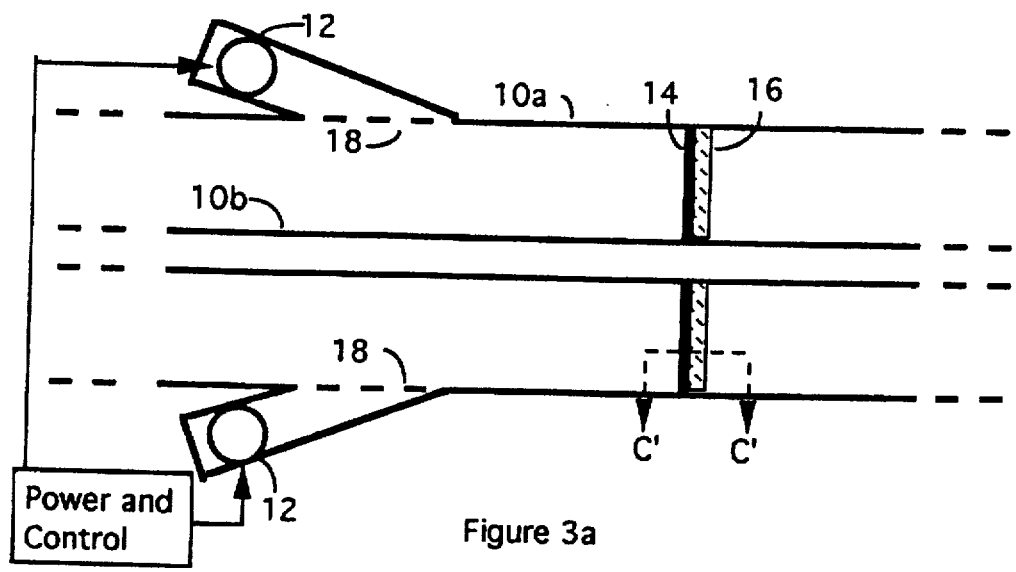
FIGS. 3a and 3b are pictorial views illustrating a portion of the TR switch of FIG. 2 in alternate coaxial line and waveguide transmission line forms, respectively.
Figure 3B:
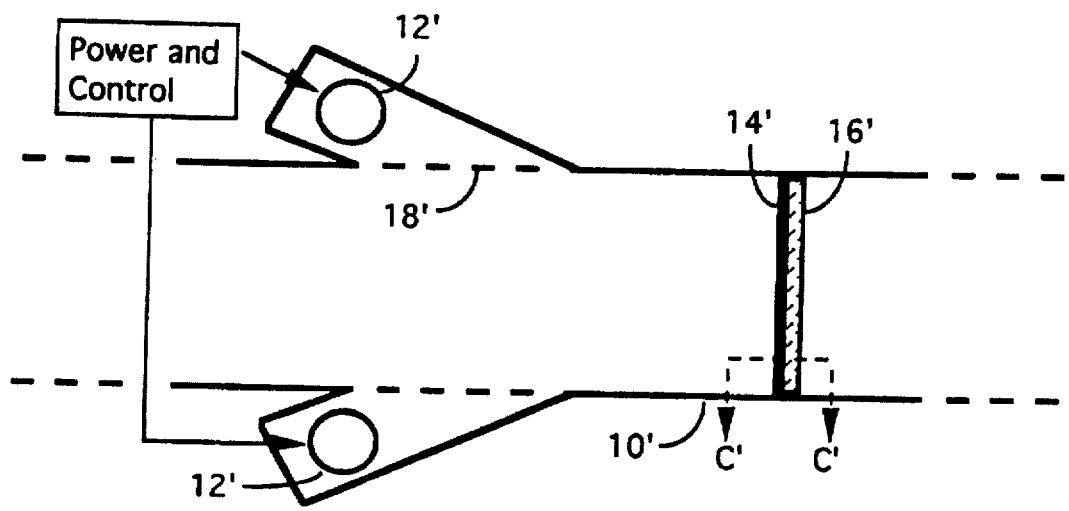

A portion of the TR switch of FIG. 2 is illustrated in greater detail pictorially as better illustrates the relationship of the baffle in the switch combination. Reference is made to FIGS. 3a and 3b, which illustrate cross sections of a conventional coaxial line 10, formed of cylindrical outer conductor 10a and a center or inner conductor 10b, and a waveguide 10', respectively.

The photoconductor 14 in FIG. 3a or 14' in FIG. 3b is positioned in the line, and the associated lamp 12 or 12', that controls the resistance of the photoconductor, is housed in a tube that opens into the line and is exposed to the surface of the respective photoconductor 14 or 14'. One or more lamps may be used, depending on the physical size of the line or waveguide and the intensity of the light available from the lamp. Two lamps 12 are shown in the alternate forms presented in FIGS. 3a and 3b. The end of the light tube is covered by a wire mesh 18 or 18'. This mesh allows currents to flow in the respective coaxial line 10 and waveguide 10', while permitting light to propagate through from lamp 12 or 12' into the waveguide.

The photoconductors are suitably thin slices of a GaAs crystal. Many other types of photoconductor may be substituted for that, including the photoconductor grid shown in FIG. 5, later herein discussed in greater detail. The thin slices of GaAs are suitably mounted on a dielectric board 16 or 16' of compatible geometry for greater physical strength. In the coaxial line version of FIG. 3a, photoconductor 14 is necessarily of a washer shape in geometry to fit in the space between the cylindrical shaped line conductors, while in the wave guide version of FIG. 3b the photoconductor is of rectangular shape. Photoconductors 14 and 14' are placed at locations R and T of FIG. 2 that are located at one fourth wavelength from the junction 25.

Figure 3C:
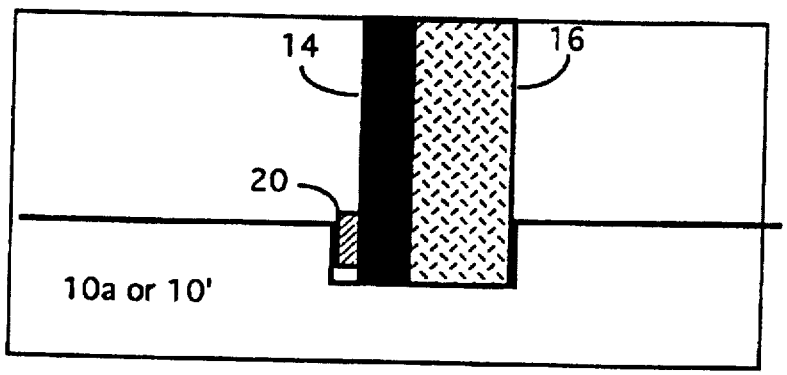
FIG. 3c is an enlarged partial section view of FIGS. 3a and 3b along the lines c'—c'.

Photoconductor 14 or 14', makes good electrical contact with the metallic or conducting parts of the coaxial line or waveguide as better illustrated in the enlarged partial view FIG. 3c to which reference is now made. FIG. 3c presents an enlarged section view taken along lines c'—c' in FIG. 3a or, alternately, taken along lines c'—c' in FIG. 3b, which are essentially identical in structure for present purposes in these views.

Preferably the dimensions of the photoconductor 14 and support 16 are slightly larger than the internal waveguide dimension and the waveguide is formed with a slot or groove in the waveguide walls at the appropriate position along the waveguide's length in which to seat and hold the photoconductor. A spring, fillet, or shim 20 firmly holds the photoconductor 14 in place, and simultaneously guarantees good electrical contact with the wall of the waveguide or line. This spring can be a strip of so called finger stock well known to microwave engineers, or it can be formed of a material that is simultaneously electrically conductive and translucent or transparent. Such materials are available in the form of glass or plastic.

When lamp 12 of FIG. 3a or lamp 12' of FIG. 3b, respectively illuminates the associated photoconductor, 14 or 14', respectively, the photoconductor electrically short circuits the transmission line, and causes reflection of radio energy that was propagating down the line.

A TR switch structure of more novel configuration is illustrated and defined by FIGS. 4a, 4b and 4c, which are next considered. FIG. 4a schematically illustrates the overall TR switch arrangement as connected for operation in a microwave radar system. The TR switch employs two identical waveguide couplers 41 and 43, modified in the manner hereafter described. FIG. 4b is an electrical schematic of the two couplers and FIG. 4c is a simplified pictorial view of one of the two couplers in the dual coupler structure.

As illustrated in FIG. 4c, coupler 41 is formed of two rectangular waveguides of equal length defining two passages that are joined side-by-side by a common wall 51. Two openings or ports, port A and port B, are located at one end of the coupler, that most proximate the reader, and two are located at the rear, Port C and Port D. Port C is at one end of one passage and port A is at the other end of that passage, while port B and port D serve as opposed ends of the remaining rectangular microwave passage. Dividing wall 51 contains two spaced rectangular slot openings. In accordance with the present invention, each slot opening is covered by a respective photoconductor 48 and 49, which are affixed to the metal wall 51. Further a light guide 50 is bifurcated and coupled to each of the two small openings 51 and 52 in a side wall of the coupler. Openings 51 and 52 allow light from light guide 50 to reach the respective photoconductors, 48 and 49, respectively. Coupler 43, the second coupler in the dual coupler arrangement, is identical in structure with coupler 41.

Design of coupler structures such as the foregoing, apart from the photoconductor addition, is well understood in the microwave art. As example when designed for operation with RF at a wavelength of 30 centimeters (cm), the dimensions of the waveguide from which coupler 41 is fabricated would be 16.5 cm by 8.25 cm. The two slots cut in the common side wall 51 would typically be about 7.6 cm by 1.5 cm in size.

Two of the foregoing coupler structures are placed serially in tandem. Thus port C and port D of coupler 41 is connected to port A' and B', respectively, of coupler 43, as is illustrated in the schematic of FIG. 4b and in FIG. 4a. The end of light guide 50 is coupled optically to lamp 42.

In operation of such couplers, radio energy is coupled from one waveguide to the other via the slots, and the slots are sized so that one half the RF energy applied to an input port flows from one waveguide to the other through the slots. Energy that enters port A of FIG. 4c for example, exits Ports C and D, with one half the energy appearing at each of the latter ports. Furthermore, the energy appearing at Port D would be 90 degrees out of phase with that appearing at Port C. None of that energy, however, appears at port B, except some very small amount as may be due to imperfections in the coupler construction. To address the latter, as shown in FIG. 4a, a matched load is placed at Port B to absorb this small amount of energy, such as illustrated as 47 in FIG. 4a. In like manner, energy that enters Port B' exits equally, but 90 degrees out of phase, at Ports C' and D'.

Since the sidewall slots in each coupler are filled with photoconductive material, when the photoconductors are illuminated and conductive, the slots are electrically closed and a simple waveguide is formed between transmitter 23 and antenna 19. RF energy propagates from the transmitter via the path C', A', C, and A to the antenna.

Ideally, no RF energy leaks to the receiver 21. However, as an added precaution, another photoconductor 46, located in the transmission line between the TR switch and the receiver, shorts the transmission line to the receiver using the arrangement of FIG. 3a as previously described.

In operation, controller 45 normally energizes lamp 42, which, suitably, is a laser or other rapidly switchable light source. The controller is connected to associated radar transmitter circuits, senses when the transmitter is to generate RF and in response energizes lamp 42.

In the transmit mode, lamp 42 illuminates and causes all five photoconductors to be conductive. Light reaches the photoconductors via light guide 50. Power for the lamp is numbered 44, and the control 45 of this power is via the conventional radar pulsing circuits, not illustrated. In the receive mode, lamp 42 is extinguished and the five photoconductors 48, 49, 48', 49' and 46 are in their non-conductive state. Hence, all RF power from antenna 19 is directed by couplers 41 and 43 to receiver 21.

Turning to FIG. 4b, one half the RF power received at the antenna flows from A to C to A' to D'. The remaining one half of that RF power flows from A to D to B' to D'. Energy that might want to flow from A to D to B' to C' is 180 degrees out of phase with an equal amount of energy that might want to flow from A to C to A' to C'; consequently, there is calcellation and no RF energy is output at C'.

Figure 5:
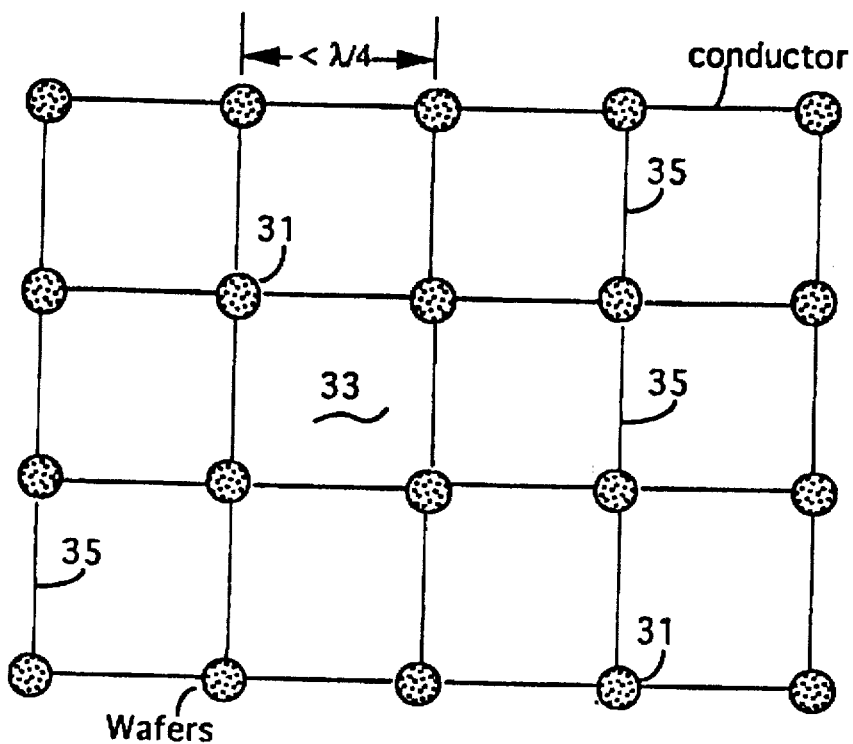
FIG. 5 is a top plan view of an alternative embodiment of a photoelectric baffle element that is useful in the microwave devices of FIGS. 1–4.

In the foregoing embodiments the baffle was formed of a slice of crystal, as suitable example. An alternative structure for the baffle is presented in FIG. 5, to which reference is made. FIG. 5 is a not to scale pictorial top plan view of a photosensor array that serves as another variable reflectivity device that serves as a baffle in the preceding devices and may be substituted for the continuous sheet or layer of photosensitive material described for the embodiments of FIGS. 1–4. In this construction the photosensitive material is formed in a plurality of discrete or, as variously termed, separate spots or wafers 31 that are spaced about the surface of a layer or sheet of dielectric material.

Wafers 31 are physically supported in spaced relationship by wires 35. Alternatively the wafers and the conductor wires may be affixed on the top surface of a supporting dielectric material, not illustrated. The wafers are approximately evenly distributed about the surface to form an array with the spacing between wafers being appreciably less than one quarter wavelength at the frequency of RF that the associated device is designed to encounter. A plurality of thin electrical conductors 35 connects each wafer to adjacent wafers to form a uniform square grid on the surface. Each photosensitive spot or wafer 31 is electrically conductive when illuminated and is nonconductive when in the dark.

When an RF wave impinges on the wire grid of FIG. 5 and when the connecting spots are conductive, the RF wave is reflected, almost as well as though the grid were a continuous sheet. When the spots are not conductive, the RF wave penetrates the grid almost as though it was not present and the baffle effectively transparent. Much less photosensitive material is required with the foregoing grid arrangement. Further, full surface illumination by the light source is not required. An optic fiber can be used to conduct light from a light source, such as a lamp, to each of the photosensitive spots.

Figure 6:
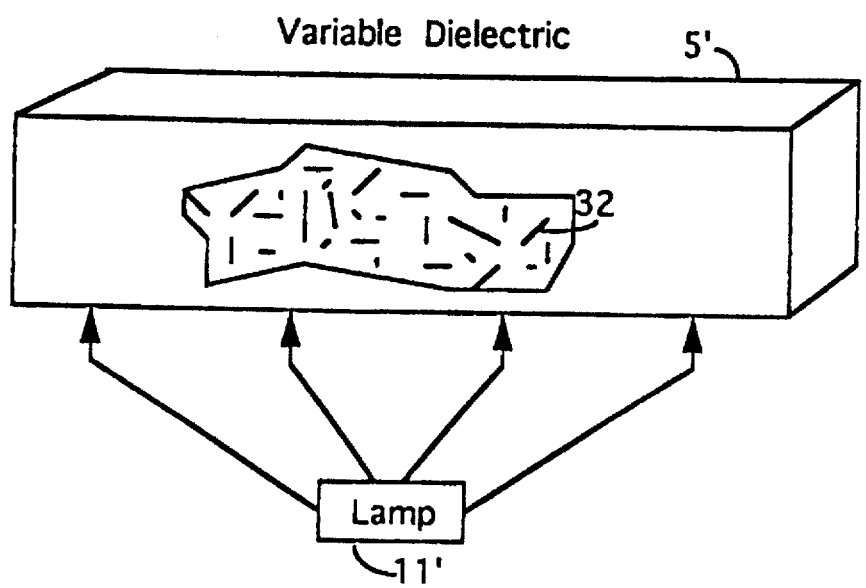
FIG. 6 pictorially illustrates still another embodiment of a photoelectric baffle element useful in the microwave devices of FIGS. 1–4.

A further alternative baffle structure is presented in FIG. 6, to which reference is made. This embodiment of the baffle 5' is constructed of a transparent dielectric material, such as a thermosetting plastic or an epoxy, in which strips, fibers or short rods 32 of photosensitive material, suitably Gallium Arsenide (GaAs) or GaN, are embedded. When illuminated, these strips are conductors, and, when in the dark, the strips are dielectrics. The short narrow strips of photosensitive material are scattered throughout the transparent layer of dielectric material. Dielectric 5' may be fabricated in one of several ways. It may be molded; that is, photosensitive fibers can be mixed with a thermosetting plastic and poured into a mold. It can be constructed in layers; that is, a thin sheet of transparent dielectric can have the fibers glued to the surface, and several such sheets glued together. In the latter case, the sheet thickness is appreciably less than one quarter wavelength.

The strips in dielectric 5' of FIG. 6 may be a variety of different lengths, normally shorter in length than one quarter wavelength at the microwave frequencies employed during operation. The strips are usually randomly oriented, but, ideally, are not in physical contact with one another. This is accomplished by thoroughly mixing during the molding process, earlier described, or by proper placement of strips when the baffle is constructed in layers.

Since the dielectric is transparent, external illumination applied to the dielectric passes through the dielectric to the embedded photosensitive rods. The rods change their electrical characteristic in response to that illumination, changing from the electrically non-conducting state to one that is electrically conductive, remaining so only while exposed to that illumination.

The baffle of FIG. 6 is a variable dielectric. When a radar wave impinges upon a dielectric surface, the dielectric reflects the radar wave if the dielectric constant $\epsilon$ is much greater than unity and the magnetic permeability $\mu$ is unity. However, the radar wave traverses the dielectric, if the relative dielectric constant is near unity in value. The relative dielectric constants that are employed in the foregoing baffle material are greater or equal to unity. For normal incidence of RF, the reflection coefficient is given by:

$$Ref.Coeff. = (\mu - \sqrt{\mu} \ \sqrt{\epsilon})/(\mu + \sqrt{\mu} \ \sqrt{\epsilon})$$

where μ and ε are overall properties of the composite material, and not the properties of the individual components. The reflection coefficient approaches unity for large values of ε, when μ is unity. For most non-ferrous materials, μ is unity, but the μ of plastics can be made large, if desired, by adding particles of a high-μ, non conducting material, such as garnet powder. The μ and ε values of selected materials can be determined by making reference to available handbooks containing tabulations of the physical properties of materials.

Embedding conductors in a layer or sheet of dielectric material of a given dielectric constant, increases the value of the layer's dielectric constant overall. The dielectric constant increases when more conductors are embedded. In operation, illuminating the embedded strips changes their state from electrically non-conducting to conducting, thereby changing the dielectric constant from a unity value to a higher than unity value. The baffle then is reflective to the incident microwave energy.

The baffle of FIG. 6 may be used in two ways. When the density of photoconductor strips is high and magnetic powder is present so that in darkness the reflection coefficient is zero, the baffle may be substituted for one of the baffles in the embodiment of FIG. 1, such as baffle 5.

In the second application, the variable dielectric material can fill the entire cavity as illustrated in FIG. 7. This can be fabricated by mixing photoconductive strips into thermosetting material and pouring into a cavity as a mold. The light source 30 in this case will be a variable intensity lamp whose range of intensities causes the conductivities of the photosensitive strips to gradually change. As the conductivities increases, the dielectric constant of the variable dielectric gradually increases and the resonant frequency of the cavity gradually decreases. The lamp controller and power supply 31 adjusts the intensity of light. In this application the density of photosensitive strips is small. When the low density variable dielectric of FIG. 7 is used as a baffle in the embodiment of FIG. 1, two resonant frequencies result.

The baffle of FIG. 6 can be made absorptive by making strips 32 long and thin in geometry. For narrowband absorption, the thin wires can be made one half wavelength in length. The baffle can be formed to any desired thickness. It need not be planar, as illustrated, but in other applications may be made of complex shape so as to conform to an irregular surface as appropriate to the particular application.

The strips may be formed of a mixture of different photosensitive material, each type being sensitive to a different wavelength of light, whereby ε can have several sets of values. It can be made with μ of the base material equal to the ε of the base material so that in the dark, the RF reflection is zero. Embedded magnetic particles can be encased in a thin layer of photosensitive material that shields the magnetic particles when the material is illuminated. Encapsulation in that way permits the μ to be quickly changed.

It is believed that the foregoing description and illustration of various microwave devices and baffles is sufficient demonstration of the broad scope of the present invention, but one other application merits some consideration before concluding this specification. A variable electronic baffle may be applied in an antenna to the reduction of antenna side lobes, in particular the back lobes associated with the antennas radiation.

There are many cases involving radar and communication systems for which a reduction of back-lobe level relative to the main-lobe level is desirable. For example, the antennas on radar cross section ranges attempt to measure the radar echo from high stealth, low cross section targets placed in the main beam of the antenna, but a building to the rear of the antenna may have a radar cross section that is 30 decibels larger than the stealth target. In such situation the echo from the building will be equal to that of the stealth target when the back lobe level is 30 decibels less than the main lobe level. Consequently, a reduction of back lobe level of ten decibels or more in this case is desirable.

Reference is made to FIG. 8a, which shows part of a phased array having dipoles 71 as radiating elements. The back plane, or sometimes called ground plane, 70, helps direct the energy somewhere above the ground plane. Because currents flow around the edges of the ground plane, some energy is radiated in the backward direction. A plot of the radiated energy as a function of direction backward will show the back lobes.

In this embodiment the back lobes are reduced by adding a layer of radar absorbing material 72 near the edge of the back plane, which helps somewhat. More importantly by adding a baffle 60 adjacent ground plane 70, as shown, connected by elements in the junction, represented by the block 61, which is illustrated in detail in the alternate embodiments of FIG. 8b or 8c, next discussed, the baffle acts as sort of an extension to the ground plane. The width of baffle 60 is suitably about one half wavelength at the operating frequency.

Junction 61 between the back plane and baffle is partially illustrated in larger scale in FIGS. 8b and 8c, which illustrate two alternatives for the connecting and switching material in such junction. In FIG. 8b the switch diodes 62 are turned on and off by the rapid closing and opening of switch 64 which applies and removes the voltage bias produced by battery 66. Switch 64 in turn is controlled by switch control circuit 67. The switch control circuit 67 may be a simple variable oscillator.

In FIG. 8c the photoconductor 63 is made to be alternately conductive and non conductive by the application or extinguishing of light from a light source 74. This light source of course must of course be associated with an appropriate power supply and a controller, which are not illustrated in the figure.

Returning to FIG. 8a, it is seen that baffle 60 is indeed an extension of ground plane 70 when switching diode 62, of FIG. 8b, or photoconductor 63, of FIG. 8c, is electrically conducting. When such respective diode or photoconductor is conducting, currents flow around the outer edge 65 of the baffle. When they are not conducting, currents flow around the edge 73 of the back plane. In either case such currents cause back lobes. However, when the diodes or photoconductor is rapidly switched on and off, these back lobes appear at two different frequencies from that of the incident RF, a frequency that equates with the radar frequency of the incident radar signal plus and minus one half the switching frequency. The switching frequency can be chosen to place the back lobe frequencies outside the pass band of the receiver, essentially placing them out of the way, and, accordingly, the measurements are no longer affected by the back lobes.

Furthermore the switching rate can be varied to cause a smearing of the back lobe frequency. Although not necessary to an understanding of the invention, for the interested person the physical process that produces such frequency smearing is described in more detail in my earlier filed application Ser. No. 08/273,576, which description is incorporated herein by reference. The foregoing modifications serves equally well for a parabolic reflector antenna as for a phased array, and it will serve equally well for any antenna having a back plane.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. In an antenna having at least one radiating element for radiating RF energy of a predetermined frequency and a back plane reflector for said radiating element, the improvement comprising:

an extension element spaced from and located adjacent to said back plane reflector, said extension element extending outwardly from an edge of said back plane reflector to thereby effectively extend said back plane upon electrical connection of said extension element to said back plane, said extension element being one half wave length in length at said predetermined frequency; and means for alternately electrically connecting and disconnecting said extension element to said back plane reflector, to thereby reduce generation of back lobes at said predetermined frequency.

2. The invention as defined in claim 1, wherein said extension element is co-planar with said back plane reflector.

3. In an antenna having at least one radiating element for radiating RF energy of a predetermined frequency and a back plane reflector for said radiating element, the improvement comprising:

an extension element spaced from and located adjacent to said back plane reflector, said extension element being one half wave length in length at said predetermined frequency; and means for alternately electrically connecting and disconnecting said extension element to said back plane reflector, to thereby reduce generation of back lobes at said predetermined frequency, wherein said means includes a switching diode connected between said extension element and said back plane reflector.

4. In an antenna having at least one radiating element for radiating RF energy of a predetermined frequency and a back plane reflector for said radiating element, the improvement comprising:

an extension element spaced from and located adjacent to said back plane reflector, said extension element being one half wave length in length at said predetermined frequency; and means for alternately electrically connecting and disconnecting said extension element to said back plane reflector, to thereby reduce generation of back lobes at said predetermined frequency, wherein said means includes a switch transistor connected between said extension element and said back plane reflector.

* * * * *